US008423366B1

(12) United States Patent
Foster et al.

(10) Patent No.: US 8,423,366 B1
(45) Date of Patent: Apr. 16, 2013

(54) AUTOMATICALLY TRAINING SPEECH SYNTHESIZERS

(75) Inventors: Marcus Alexander Foster, West Malling (GB); Richard Zarek Cohen, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/552,484

(22) Filed: Jul. 18, 2012

(51) Int. Cl.
*G10L 13/00* (2006.01)

(52) U.S. Cl.
USPC ............ 704/260; 704/258; 704/261; 704/266

(58) Field of Classification Search .................. 704/243, 704/244, 258–269, 246, E13.001, 13.002, 704/13.004
See application file for complete search history.

(56) References Cited

U.S. PATENT DOCUMENTS

| | | | | |
|---|---|---|---|---|
| 6,735,565 | B2 * | 5/2004 | Gschwendtner | 704/254 |
| 6,978,238 | B2 * | 12/2005 | Wohlsen et al. | 704/246 |
| 7,103,548 | B2 * | 9/2006 | Squibbs et al. | 704/260 |
| 2002/0120450 | A1 * | 8/2002 | Junqua et al. | 704/258 |
| 2002/0193994 | A1 * | 12/2002 | Kibre et al. | 704/258 |
| 2003/0028377 | A1 * | 2/2003 | Noyes | 704/258 |
| 2003/0028380 | A1 * | 2/2003 | Freeland et al. | 704/260 |
| 2006/0074672 | A1 * | 4/2006 | Allefs | 704/258 |
| 2006/0095265 | A1 * | 5/2006 | Chu et al. | 704/268 |
| 2007/0036301 | A1 * | 2/2007 | Voticky et al. | 379/88.22 |
| 2010/0030557 | A1 * | 2/2010 | Molloy et al. | 704/235 |
| 2011/0165912 | A1 * | 7/2011 | Wang et al. | 455/563 |

OTHER PUBLICATIONS

Gibson, Matthew. "Two-pass decision tree construction for unsupervised adaptation of HMM-based synthesis models," in Proceedings Interspeech, 2009.*
Kurimo et al., "Personalising speech-to-speech translation in the EMIME project", Jul. 13, 2010. Proceedings of the ACL 2010 System Demonstrations, pp. 48-53.
Kain et al., "Text-to-Speech Voice Adaptation from Sparse Training Data," 1998. Center for Spoken Language Understanding (CSLU), 4 pgs.
Smith, "Text to Speech", Voicegal's Blog [online], May 22, 2011. Retrieved from the Internet: <http://voicegal.wordpress.com/tag/text-to-speech/> 4 pgs.

* cited by examiner

*Primary Examiner* — Jesse Pullias
(74) *Attorney, Agent, or Firm* — Shumaker & Sieffert, P.A.

(57) ABSTRACT

A method includes receiving, by a system, a voice recording associated with a user, transcribing the voice recording into text that includes a group of words, and storing an association between a portion of each respective word and a corresponding portion of the voice recording. The corresponding portion of the voice recording is the portion of the voice recording from which the portion of the respective word was transcribed. The method may also include determining a modification to a speech synthesis voice associated with the user based at least in part on the association.

29 Claims, 8 Drawing Sheets

AUTOMATICALLY TRAINING SPEECH SYNTHESIZERS

BACKGROUND

Speech synthesis occurs when a speech synthesizer converts written language text into audible speech. There are several methods for performing speech synthesis. One example of a speech synthesizer is a concatenative speech synthesizer which may concatenate several pieces of pre-recorded speech to synthesize the sound of text being read aloud. Another example of a speech synthesizer is a statistical parametric synthesizer that may adapt various vocal parameters of a system (e.g. frequency spectrum, fundamental frequency, rhythm, stress, and intonation) to create an audio sample that mimics the sound of speech. Speech synthesizers often use a generic speech synthesis voice that may result in the audible speech sounding impersonal and artificial. Generating a customized speech synthesis voice for use by a speech synthesizer can be difficult. Typically, to create a customized speech synthesis voice, a user needs to spend a significant amount of time reading a lengthy prepared script to provide the sounds required for a machine to learn the enunciation of all words of a particular language. The sounds can then be concatenated together or used to alter the parameters of a statistical parametric synthesizer model, and serve as the basis for the custom speech synthesis voice.

SUMMARY

In one example the disclosure is directed to a method. The method may include receiving, by a system, a voice recording associated with a user. The method may further include transcribing, by the system, the voice recording into text that includes a group of words. The method may further include storing, by the system, an association between a portion of each respective word from the group of words and a corresponding portion of the voice recording, wherein the corresponding portion of the voice recording is the portion of the voice recording from which the portion of the respective word was transcribed. The method may further include determining a modification to a speech synthesis voice associated with the user based at least in part on the association.

In another example, the disclosure is directed to a computer-readable storage medium. The computer-readable storage medium may include instructions that, if executed by one or more processors of a device, cause the device to perform operations. The operations may include receiving a voice recording associated with a user. The operations may further include transcribing the voice recording into text that includes a group of words. The operations may further include storing an association between a portion of each respective word from the group of words and a corresponding portion of the voice recording, wherein the corresponding portion of the voice recording is the portion of the voicemail message from which the portion of the respective word was transcribed. The operations may further include determining a modification to a speech synthesis voice that is associated with the user based at least in part on the association.

In another example, the disclosure is directed to a system. The system may include one or more processors being configured to perform operations including receiving, by the system, a voice recording associated with a user. The operations may further include transcribing, by the system, the voice recording into text that includes a group of words. The operations may further include storing an association between a portion of each respective word from the group of words and a corresponding portion of the voice recording, wherein the corresponding portion of the voice recording is the portion of the voice recording from which the portion of the respective word was transcribed. The operations may further include determining a modification to a speech synthesis voice that is associated with the user based at least in part on the association.

In another example, the disclosure is directed to a computing device. The computing device may include one or more processors being configured to perform operations including receiving, by the computing device, a voice recording associated with a user. The operations may further include transcribing, by the computing device, the voice recording into text that includes a group of words. The operations may further include storing, by the computing device, an association between a portion of each respective word from the group of words and a corresponding portion of the voice recording, wherein the corresponding portion of the voice recording is the portion of the voice recording from which the portion of the respective word was transcribed. The operations may further include determining, by the computing device, a modification to a speech synthesis voice associated with the user based at least in part on the association.

The details of one or more embodiments are set forth in the accompanying drawings and the description below. Other features, objects, and advantages will be apparent from the description and drawings, and from the claims.

DETAILED DESCRIPTION

A speech synthesizer may use a generic speech synthesis voice to synthesize the sound of text being read aloud. In general, techniques of this disclosure are directed at using voice recordings (e.g., voicemail, and other audio or video recordings with embedded audio) to train a speech synthesis voice to sound like the voice heard in the voice recordings.

A voice recording from a user may be received and transcribed into text. Associations may be stored that correlate portions of the voice recording with corresponding portions of the text. Modifications to a speech synthesis voice associated with the user may be made based, at least in part, on the stored associations.

The speech synthesis voice associated with the user may originate as a generic speech synthesis voice (e.g., not particular to any one user). As the user generates more and more voice recordings overtime, the speech synthesis voice may automatically adapt to incorporate certain speech characteristics of each of the voice recordings. The speech synthesis voice may eventually sound less like a generic voice and more like a blend of the voices heard in the multiple voice recordings from the user. In this manner, techniques of this disclosure may provide a mechanism for automatically generating a customized speech synthesis voice with minimal, if any, effort required by the user. The speech synthesis voice associated with the user may subsequently be used to synthesize an audio sample of a textual message (e.g., e-mail, simple messaging service (SMS) message, etc.) being read aloud in a voice resembling that of the user.

Throughout this disclosure, the term voice recording includes references to a voicemail message and vice versa. In some examples, the term voicemail message (in place of the more generic term voice recording) is used to illustrate only one example and many other examples exist. Through use of the terms voicemail message or voice recording, techniques of this disclosure may encompass the use of any audio or video recording with embedded audible speech.

Figure 1:
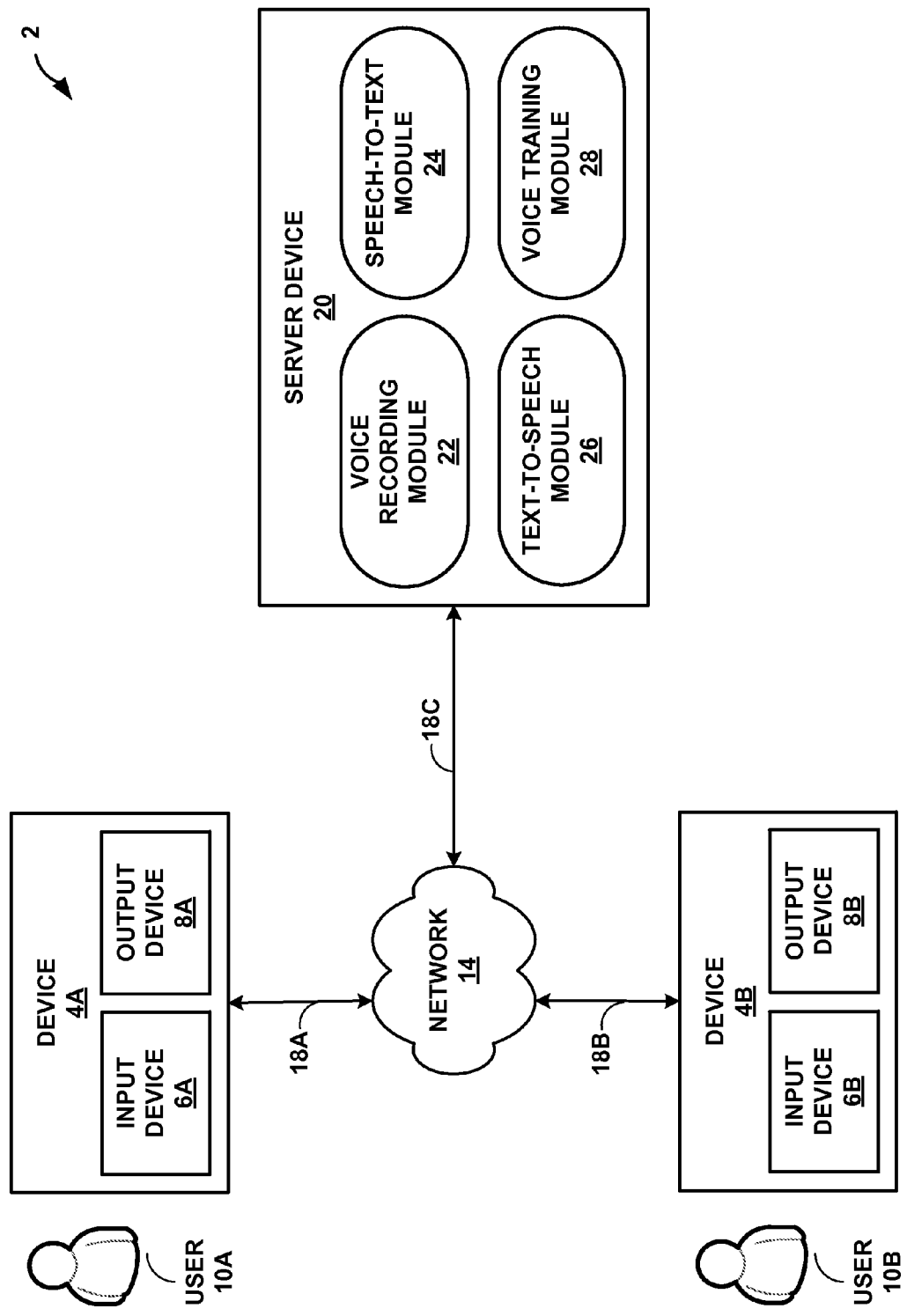
FIG. 1 is a block diagram illustrating an example system that may be used to train speech synthesizers, in accordance with techniques of this disclosure.

FIG. 1 is a block diagram illustrating an example system 2 that may train speech synthesizers, in accordance with techniques of this disclosure. As shown in FIG. 1, system 2 may include client devices 4A-4B (collectively, "devices 4") and server device 20. Devices 4 may be associated with users 10A-10B (collectively, "users 10"). For instance, a user associated with a device may interact with the device by providing various user inputs. In some examples, the device associated with the user may have one or more accounts registered with the device, and each account may have one or more services, such as a social networking service and/or telephone service. As shown in FIG. 1, user 10A is associated with device 4A and user 10B is associated with device 4B.

Devices 4 may include, but are not limited to, portable or mobile devices such as cellular phones, personal digital assistants (PDAs), laptop computers, tablet computers, portable gaming devices, portable media players, e-book readers, watches, as well as non-portable devices such as desktop computers, landline telephones, and televisions. Devices 4 may be the same or different types of devices. For example, device 4A and device 4B may both be mobile phones. In another example, device 4A may be a mobile phone and device 4B may be a tablet computer.

Device 4A may include one or more input devices 6A. In some examples, input device 6A may receive tactile, audio, or visual input. Examples of input device 6A may include a touch-sensitive and/or a presence-sensitive screen, mouse, keyboard, voice responsive system, microphone, camera or any other type of device for receiving input.

Device 4A may also include one or more output devices 8A. In some examples, output device 8A may provide tactile, audio, or video output. Output device 8A, in one example, includes a touch-sensitive display, sound card, video graphics adapter card, or any other type of device for converting a signal into a form understandable to humans or machines. Output device 8A may output content such as graphical user interface for display.

Device 4B may include the same, similar, or functionality equivalent components as device 4A. In some examples however, device 4B may include additional components or functionality not found in device 4A.

As shown in FIG. 1, server device 20 includes voice recording module 22, speech-to-text module 24, text-to-speech module 26, and voice training module 28. Server device 20 may execute with multiple processors and may have functionality distributed across multiple machines. Server device 20 may execute as a virtual machine on underlying hardware (which itself may execute as a single or multiple machines). Server device 20 may also execute as a process, or a set of processes, on a cloud server or service. Some or all of the functionality of server device 20 may alternatively or additionally reside within devices 4. Examples of server device 20 may include a personal computer, a laptop computer, a handheld computer, a workstation, a data storage system, a supercomputer, a mainframe computer, a conventional web server, a specialized media server, or other types of devices including but not limited to examples of devices 4 stated above. In some examples, modules 22, 24, 26, and 28 may perform operations described herein as software applications executable by one or more processors of server device 20. In other examples, one or more of modules 22, 24, 26, and 28 may perform operations described herein as implementations in hardware.

Devices 4 and server device 20 can be operatively coupled by communication channels 18A-18C (collectively, "communication channels 18"). Communication channels 18 may, in various instances, be wired or wireless communication channels capable of sending and receiving data. Examples of communication channels 18 may include Transmission Control Protocol/Internet Protocol (TCP/IP) connection over the Internet or 3G wireless network connection. Network 14 as shown in FIG. 1 may be any network such as the Internet, or local area network (LAN).

Users 10 can interact with each other using devices 4 by sending and receiving audio, video, or textual communications. For example, user 10A may use device 4A to call and send a voicemail message to user 10B, which user 10B may access using device 4B. At another time, user 10A may use device 4A to compose and send a textual message to user 10B, which user 10B may receive and view on device 4B.

Server device 20 may contain voice recording module 22 which performs voice recording storage and retrieval functions for server device 20. For example, where user 10A uses device 4A to call and send a voicemail message to user 10B, voice recording module 22 on server device 20 may store the voicemail message as a voice recording left by user 10A for later retrieval by user 10B. Subsequently, voice recording module 22 on server device 20 may retrieve the stored voice recording when user 10B uses device 4B to access the voicemail message from user 10A.

In addition, voice recording module 22 may perform audio extraction functions for server device 20. In the event server device 20 receives a video recording with embedded audio (e.g. video message), voice recording module 22 may extract embedded audio from the video recording. Voice recording module 22 may store the extracted audio as a voice recording.

In various instances, server device 20 may contain speech-to-text module 24 which provides voice recording transcription functions for server device 20. For example, where user 10A uses device 4A to call and leave a voicemail message for user 10B, speech-to-text module 24 on server device 20 may transcribe the voicemail message (stored by voice recording module 22 as a voice recording) into text and store the text as a textual message for user 10B to view using device 4B.

Server device 20 may contain text-to-speech module 26 which synthesizes audio samples that mimic the sound of textual messages received by server device 20, being read aloud by the sender (author). In one example, text-to-speech module 26 may contain a text-to-speech system including as inputs a speech synthesis voice associated with a user and a textual message. In one example, text-to-speech module 26 may contain outputs including an audio sample of the textual message being spoken in the voice of the speech synthesis voice. The text-to-speech system contained in text-to-speech module 26 may use concatenative text-to-speech synthesis, statistical parametric text-to-speech synthesis, or any other form of text-to-speech synthesis where the text-to-speech system receives text as input and outputs corresponding audio of the text being spoken.

In one example, user 10A may use device 4A to send a textual message to user 10B. Text-to-speech module 26 on server device 20 may receive the textual message and synthesize an audio sample that mimics the sender (user 10A) speaking the text of the message. Server device 20 may identify user 10A as the sender of the text message. Text-to-speech module 26 on server device 20 may synthesize the audio sample of the textual message being spoken by user 10A using the speech synthesis voice associated with user 10A. Server device 20 may store the audio sample synthesized by text-to-speech module 26 as if it were a voicemail message from user 10A for later retrieval by user 10B using device 4B, using voice recording module 22 as described above. Using device 4B, user 10B may optionally choose to read the original text message sent by user 10A or to listen to the audio sample generated by text-to-speech module 26.

Two applications executing on the same device 4 may perform the method described above. A first application may send the voice recording associated with user 10A and used to generate the speech synthesis voice associated with user 10A. A second application may send the textual message. The system may identify an identifier of the sender of the textual message as corresponding to user 10A. The system may select the speech synthesis voice based on the identifier and synthesize an audio sample of the textual message being spoken using the speech synthesis voice associated with user 10A.

Server device 20 may contain voice training module 28 that trains a speech synthesis voice associated with a specific user 10, so the voice heard in an audio sample synthesized using the speech synthesis voice associated with the specific user 10 (e.g., by text-to-speech module 26), sounds like the voice heard in voice recordings from the specific user 10.

For example, user 10A may send a voicemail message using device 4A to user 10B. Speech-to-text module 24 on server device 20 may transcribe the voicemail message from user 10A into text. Using the voicemail message from user 10A and the text transcribed by speech-to-text module 24, voice training module 28 on server device 20 may store associations, between portions of the text and portions of the voicemail message from which the corresponding portions of the text were transcribed. In one example, voice training module 28 may utilize a data store (e.g., a multidimensional array, link list, etc.) specific to user 10A, to store the associations. The data store may contain portions of voice recordings (e.g. voicemail messages) sent by user 10A, which are indexed and retrievable, according to the corresponding portions of transcribed text with which they correlate. Voice training module 28 may modify a speech synthesis voice associated with user 10A based at least in part on the association.

System 2 of FIG. 1 may receive a voice recording associated with user 10A and transcribe the voice recording into text that includes a group of words. System 2 may store an association between a portion of each respective word from the group of words and a corresponding portion of the voice recording. The portion of the voice recording may correspond to the portion of the voice recording from which the portion of the respective word was transcribed. System 2 may modify a speech synthesis voice associated with user 10 based at least in part on the association.

While the speech synthesis voice associated with user 10A may originate as a generic speech synthesis voice (e.g., not unique to any one user 10), modifications made by voice training module 28 may have the effect of training the speech synthesis voice associated with user 10A, so that a voice heard in an audio sample synthesized (e.g., with text-to-speech module 26) using the speech synthesis voice associated with user 10A, sounds like a voice heard in voicemail messages from user 10A. Over time, using subsequent voicemail messages and transcriptions to text from user 10A, voice training module 28 may make and store additional associations. With additional associations, voice training module 28 may further modify and improve the speech synthesis voice associated with user 10A. Eventually, the speech synthesis voice associated with user 10A may contain no similar characteristics to the generic speech synthesis voice.

Figure 2:
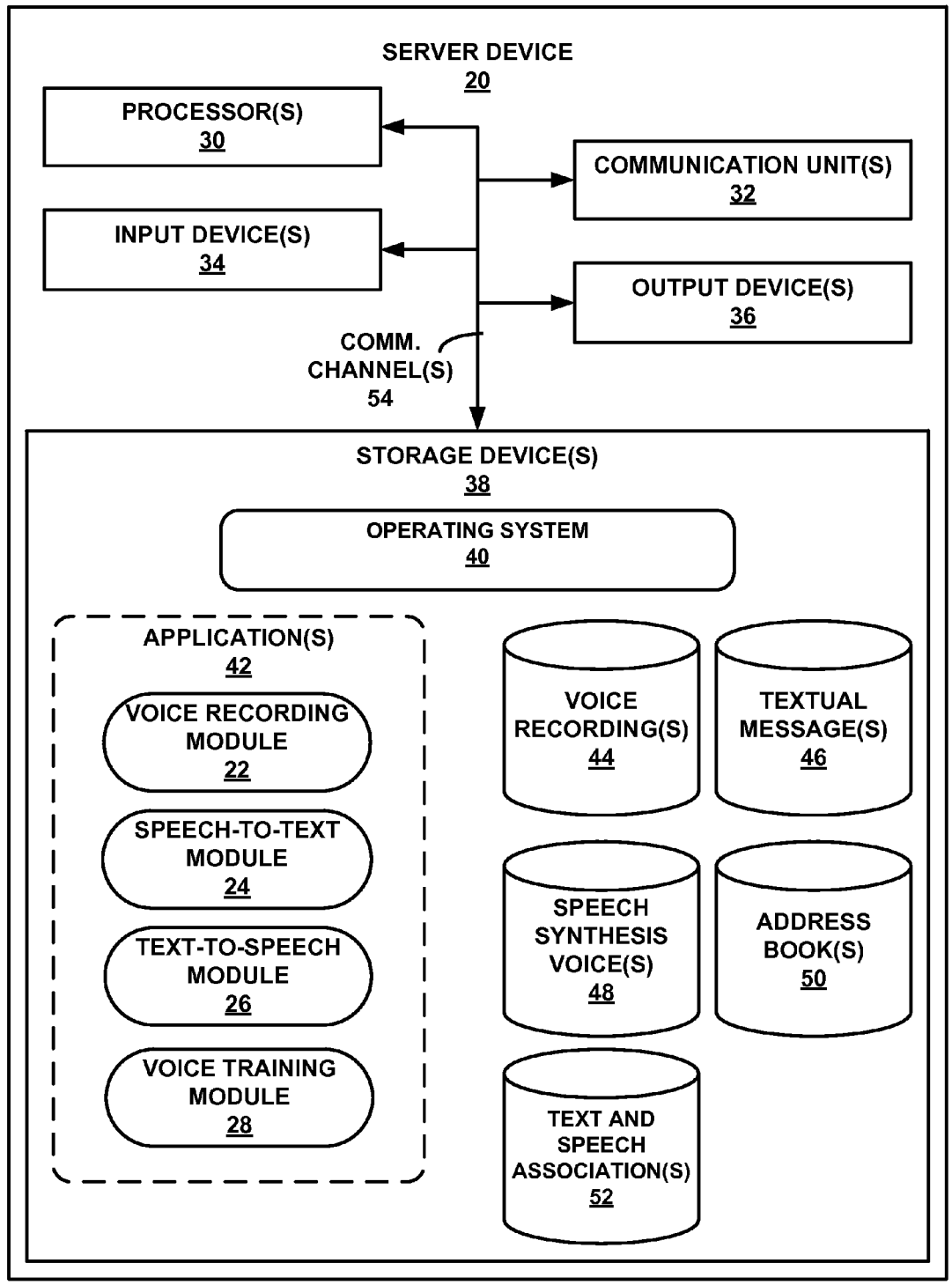
FIG. 2 is a block diagram illustrating an example server device that may be used to train speech synthesizers, in accordance with techniques of this disclosure.

FIG. 2 is a block diagram illustrating an example server device that may train speech synthesizers, in accordance with techniques of this disclosure. FIG. 2 illustrates only one particular example of server device 20, and many other example embodiments of server device 20 exits. As described above, server device 20 may execute as a standalone device or reside in whole or in part on devices 4 depicted in FIG. 1. As shown in the specific example of FIG. 2, server device 20 includes one or more processors 30, one or more communication units 32, one or more input devices 34, one or more output devices 36, and one or more storage devices 38. Server device 20 may also include an operating system 40. Server device 20, in this example, also includes one or more executable applications 42. Communication channels 54 may interconnect (physically, communicatively, and/or operatively) each of the components 30, 32, 34, 36, 38, 40, and 42 for inter-component communications. In some examples, communication channels 54 may include a system bus, a network connection, an inter-process communication data structure, or any other method for communicating data.

One or more processors 30 may implement functionality and/or execute instructions within server device 20. For example, processors 30 may process instructions stored in storage device 38 that execute functionality of applications 42.

One or more storage devices 38 within server device 20 may store information required for use during operation of server device 20. Storage device 38, in some examples, has the primary purpose of being a short term and not a long term computer-readable storage medium. Storage device 38 on server device 20 may be a volatile memory and therefore not retain stored contents if powered off. Examples of volatile memories include random access memories (RAM), dynamic random access memories (DRAM), static random access memories (SRAM), and other forms of volatile memories known in the art. Storage devices 38 may further be configured for long-term storage of information as non-volatile memory space and retain information after power on/off cycles. Examples of non-volatile memory configurations include magnetic hard discs, optical discs, floppy discs, flash memories, or forms of electrically programmable memories (EPROM) or electrically erasable and programmable (EEPROM) memories. In some examples, processors 30 on server device 20 read and execute instructions stored by storage device 38. In addition, applications 42 running on server device 20 may store information within storage device 38 during program execution.

Server device 20 may also include one or more communication units 32 to communicate with external devices via one or more networks. For example, server device 20 may use communication unit 32 to communicate with devices 4 on network 14 from FIG. 1. Examples of communication unit 32 include a network interface card (e.g. such as an Ethernet card), an optical transceiver, a radio frequency transceiver, or any other type of device that can send and receive information. Other examples of communication units 32 may include Bluetooth®, 3G, and WiFi® radios found in mobile devices as well as Universal Serial Bus (USB) controllers.

Server device 20 may contain one or more input devices 34 that server device 20 uses to receive input from a user, such as users 10 from FIG. 1, via tactile, audio, or video feedback. Input device 34 of server device 20, in one example, includes a presence-sensitive screen, a touch-sensitive screen, a mouse, a keyboard, a voice responsive system, video camera, microphone or any other type of device for detecting a command from a human or machine.

Server device may contain one or more output devices 36 that server device 20 uses to provide output to a user, such as users 10 from FIG. 1, via tactile, audio, or video stimuli. Output device 36 of server device 20, in one example, includes a presence-sensitive screen, a sound card, a video graphics adapter card, or any other type of device for converting a signal into an appropriate form understandable by human or machine. Additional examples of output device 36 include a speaker, a cathode ray tube (CRT) monitor, a liquid crystal display (LCD), or any other type of device that can generate intelligible output to a user.

Server device 20 may include operating system 40 that, in one example, controls the operation of components. For example, operating system 40 of server device 20, in one example, manages the interaction between applications 42 and processors 30, communication units 32, storage devices 38, input devices 34, and output devices 36.

As shown in FIG. 2, applications 42 may include voice recording module 22, speech-to-text module 24, text-to-speech module 26, and voice training module 28 as described above and referred to in FIG. 1. Applications 42 may each include program instructions and/or data that are executable by server device 20. For example, voice training module 28 may include instructions that cause application 42 executing on server device 20 to perform one or more of the operations and actions described in the present disclosure.

Server device 20 may include one or more data stores in the form of multidimensional arrays, linked lists, hash tables, or any other data structure type used for organizing, preserving, and retrieving information and messages associated with users 10 depicted in FIG. 1. For example, server device 20 may contain one or more address book data stores 50 that contain identifiers (e.g., names, usernames), telephone numbers, e-mail addresses, and other communication information associated with one or more users 10. Server device 20 may also contain one or more voice recording data stores 44 for preserving voicemail messages organized by message sender and recipient. Server device 20 may receive these voicemail messages or synthesize them using text-to-speech module 26. Server device 20 may also include one or more textual message data stores 46 for preserving text based messages (e.g., SMS text and e-mail). Server device 20 may receive these textual messages or transcribe the messages using speech-to-text module 24.

Server device 20 may also include one or more speech synthesis voices data stores 48 for preserving voices used in speech synthesis by text-to-speech module of server device 20. Each speech synthesis voices data store 48 may include one or more elements. Each element may contain a phonetic representation of text and a unique audio sample correlating to the phonetic representation of text. Phonetic representations are alphabet letters and symbols used to represent the spoken pronunciation of a word in a human language. For example, in the English language, a phonetic representation of the word elephant may be 'el-uh-fuhnt'. Server device 20 may also include one or more text and speech associations data stores 52 for storing associations, between portions of text transcribed from a voicemail message and portions of the voicemail message from which the text was transcribed. FIG. 2 depicts, as an example, data stores 44, 46, 48, 50, and 52 residing locally on storage device 38 within server device 20. In other examples, data stores 44, 46, 48, 50, and 52 may reside remotely to server device 20, for example either partially or completely on devices 4 of FIG. 1, or partially or completely within some other remote data storage medium such as a cloud server.

In accordance with aspects of this disclosure, communication unit 32 of server device 20 in FIG. 2, may receive a voicemail message on network 14, sent by user 10A on device 4A to user 10B depicted in FIG. 1. Communication unit 32 may transmit the voicemail message received from user 10A to voice recording module 22 of server device 20 using internal communication channels 54 of server device 20. Upon receiving the voicemail message from user 10A, voice recording module 22 may archive the voicemail message to the voice recordings data store 44, located in storage device 38 of server device 20. Speech-to-text module 24 of server device 20 may retrieve the archived voicemail message sent by user 10A from the voice recordings data store 44 and transcribe the voicemail message into text. Speech-to-text module 24 of server device 20 may then archive the transcribed text to the textual messages data store 46 located in storage device 38 of server device 20 for later retrieval by user 10B on device 4B of FIG. 1. Using the voicemail message from user 10A stored in the voice recordings data store 44, and the text transcribed by speech-to-text module 24 stored in the textual messages data store 46, voice training module 28 of server device 20 may correlate and store as associations (as described above in relation to FIG. 1) portions of the transcribed text and portions of the voicemail message from user 10A from which the corresponding portions of the text were transcribed, in text and speech associations data store 52 in storage device 38.

Voice training module 28 of server device 20 may search the speech synthesis voices data store 48 for a speech synthesis voice specific to user 10A. If a speech synthesis voice specific to user 10A does not already exist within the speech synthesis voices data store 48, voice training module 28 of server device 20 may create, starting with a generic speech synthesis voice, a speech synthesis voice specific to user 10A and store it within the speech synthesis voices data store 48.

Voice training module 28 may modify the speech synthesis voice associated with the user 10A and stored within the speech synthesis voices data store 48 in storage device 38, based at least in part on the stored associations specific to user 10A stored within the text and speech associations data store 52. For example (as described above in relation to FIG. 1) voicemail module 28 of server device 20 may modify what originates as a generic speech synthesis voice, using at least in part, the stored associations specific to user 10A in the text and speech associations data store 52, to generate a speech synthesis voice specific to user 10A. Voice training module 28 may store the speech synthesis voice specific to user 10A in the speech synthesis voices data store 48 in storage device 38.

Communication unit 32 of server device 20 may subsequently receive a textual message (e.g., e-mail or SMS message) transmitted on network 14, from user 10A on device 4A (or a different device associated with user 10A). Communication unit 32 of server device 20 may store the textual message received from user 10A in the textual messages data store 46 in storage device 38 of server device 20. Text-to-speech module 26 of server device 20 may retrieve the textual message from user 10A, stored within the textual messages data store 46, and may identify the textual message as being from user 10A.

In one example, text-to-speech module 26 may identify the textual message sender as user 10A by performing a lookup of a message identifier associated with the textual message (e.g., address or phone number), within the address books data store 50 of storage device 38 to match the message identifier to an entry within address books data store 50 that contains the identity of the user 10A. Using the speech synthesis voice associated with user 10A, stored in the speech synthesis voices data store 48, text-to-speech module 26 may synthesize an audio sample that mimics the voice of user 10A reading aloud the textual message from user 10A. Server device 20, using voice recording module 22, may archive the synthesized audio sample generated by text-to-speech module 26, as a voicemail in the voice recordings data store 44 of storage device 38, that user 10B may later retrieve and listen to using device 4B.

While the speech synthesis voice associated with user 10A may originate as a completely generic speech synthesis voice, further modifications made by voice training module 28, to the speech synthesis voice associated with user 10A and stored in the speech synthesis voices data store 48, may have the effect of training the speech synthesis voice associated with user 10A, so that a voice heard in an audio sample synthesized by text-to-speech module 26 of server device 20, using the speech synthesis voice associated with user 10A, sounds like a voice heard in voicemail messages from user 10A. Over time, using associations from subsequent voicemail messages from user 10A and transcriptions to text stored in text and speech associations data store 52, voice training module 28 may further modify and improve the speech synthesis voice associated with user 10A stored in speech synthesis voices data store 48. Eventually, the speech synthesis voice associated with user 10A may contain no characteristics of the generic speech synthesis voice.

In one example, server device 20 may receive a voicemail message from a user 10A on device 4A. Server device 20 may identify an identifier of user 10A based on the voicemail message so that prior to modifying a speech synthesis voice using voice training module 28, server device 20 may select the speech synthesis voice associated with user 10A based on the identifier.

For example, server device 20 may identify the identifier of user 10A by performing a lookup in an address book data store 50, based at least in part on a phone number associated with the voicemail message, to identify an entry of the address book data store 50 associated with the user 10A, and obtaining the identifier from the entry of the address book data store 50 associated with the user 10A.

In another example, server device 20 may use a voiceprint comparison to identify the identifier of user 10A. A voiceprint may identify a user because, like a finger print, two persons almost never have the exact same voiceprint. The unique signal properties of a voiceprint generated from an audio sample may uniquely identify a single speaker. Server device 20 may identify the identifier of user 10A by generating a voiceprint of the voicemail message and comparing the voiceprint to voiceprints generated from previously received voicemail messages. Address book data store 50 associated with users 10 may store the voiceprints generated from previously received voicemail messages. By identifying portions of the voiceprint matching portions of the previously generated voiceprints, server device 20 may identify a user 10 associated with the matching voiceprints and obtain the identifier user 10A.

In one example server device 20 may allow for error correction of a voice recording transcription to text performed by speech-to-text module 24. User 10 may optionally perform error correction through manual inputs. For example, server device 20 may receive a voice recording from a user 10A on device 4A. Speech-to-text module 24 of server device 20 may transcribe the voice recording to text. As an option, user 10A may elect to receive the transcribed text as a textual message sent by server device 20 to user 10A on device 4A. User 10A may view the textual message and if user 10A identifies errors in the server device 20 transcription, user 10A may send a correction to server device 20. Server device 20 may use the correction to update the stored associations, associated with user 10A, between the voicemail message from user 10A and the text transcribed by speech-to-text module 24. In another example, an application 42 on server device 20 or another device 4 communicating with server device 20 may perform the error correction and send the error corrections to server device 20 on network 14.

Server device 20 may modify a speech synthesis voice associated with a user 10A after receiving a voice recording, regardless of what specific device 4 or application on device 4 user 10A uses to send the voice recording. For example, server device 20 may perform the method described above, of modifying a speech synthesis voice associated with a user 10A based on a first voicemail received from user 10A on device 4A. As previously described, server device 20 may generate a textual transcription of the first voicemail containing a first group of words. Server device 20 may update the text and speech associations data store 52 specific to user 10A using portions of the first group of words and portions of the first voicemail. Server device 20 may receive a second voicemail message from the same user 10A on a different device 4B. Similar to the method performed after receiving the first voicemail message from user 10A, server device 20 may transcribe the second voicemail message from user 10A into text that includes a second group of words.

Server device 20 may store an association (in the text and speech associations data store 52 specific to user 10A) between each word of the second group of words and a corresponding portion of the second voicemail message, wherein a word of the second group of words is associated with a portion of the second voicemail message, wherein a word of the first group of words from the first voicemail message is associated with a portion of the first voicemail message, wherein the portion of the first voicemail message and the portion of the second voicemail message are the same, and wherein the word of the first group of words is different than the word of the second group of words. Server device 20 may update, based at least in part on the stored association between the word of the second group of words and the portion of the second voicemail message, the stored association between the word of the first group of words and the portion of the first voicemail message. Server device 20 may modify the speech synthesis voice associated with user 10A and stored in the speech synthesis voices data store 48, based at least in part on the association.

Server device 20 may modify and store multiple unique speech synthesis voices, each speech synthesis voice associated with unique users. For example, server device 20 may receive a first voicemail message from a first user 10A on first device 4A and voice training module 28 may modify, according to the methods described above, a speech synthesis voice associated with first user 10A. Server device 20 may receive a second voicemail message from a second device 4B associated with a second user 10B. Server device 20 may identify an identifier of the second user 10B and select a second speech synthesis voice from the speech synthesis voice data store 48, wherein the second speech synthesis voice is associated with the identifier of the second user 10B. Voice training module 28 of server device 20 may modify the second speech synthesis voice associated with the identifier of the second user 10B. Server device 20 may identify the identifier by performing a lookup, using a method similar to that described above. For example, performing a lookup based at least in part on a phone number associated with the second voicemail message or by generating a voiceprint of the second voicemail message and comparing the voiceprint with previously generated voiceprints stored within entries of address book data store 50.

Figure 3:
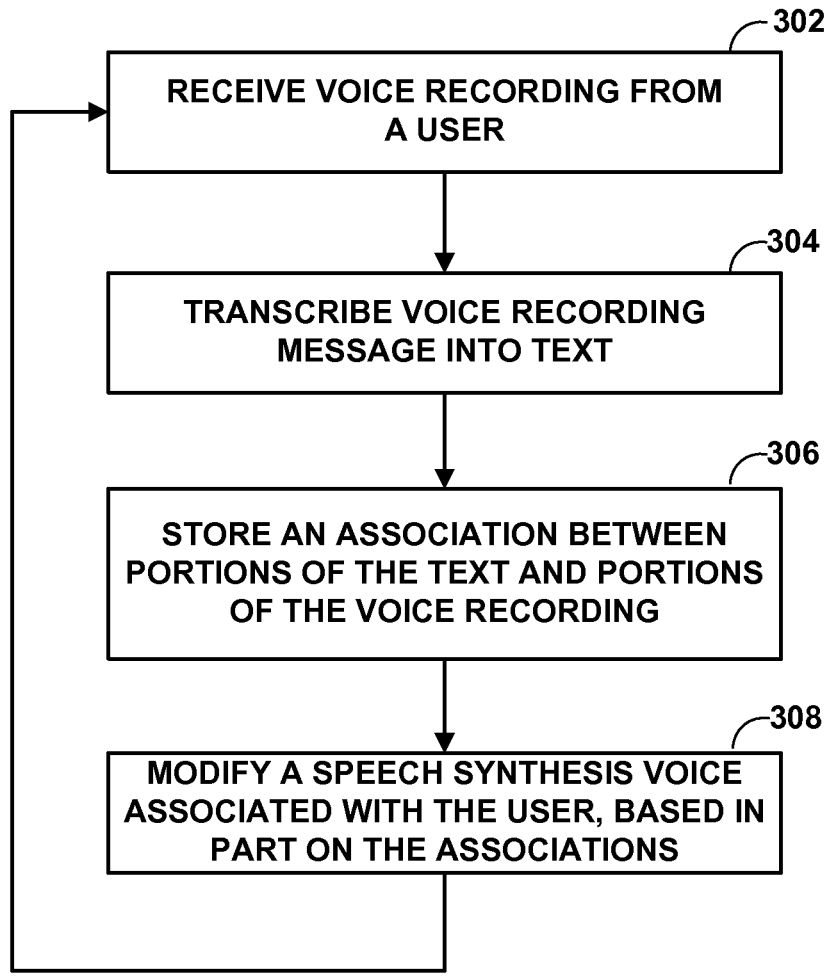
FIG. 3 is a flowchart illustrating an example operation for training speech synthesizers, in accordance with techniques of this disclosure.

FIG. 3 is a flowchart illustrating an example operation for training speech synthesizers, in accordance with techniques of this disclosure. One or more devices in a communication system may perform the method of FIG. 3, for example, such as the system illustrated in FIG. 1. For purposes of illustration only, FIG. 3 is described below within the context of devices 4 of FIG. 1 and server device 20 of FIG. 1 and FIG. 2.

In one example, user 10A may send a voice recording (e.g. a voicemail message) to user 10B using device 4A, communicating on network 14. In that case, voice recording module 22 of server device 20 may receive the voice recording from user 10A and store the voice recording for subsequent retrieval by user 10B on device 4B (302). Upon receipt of the voice recording from user 10A, speech-to-text module 24 of server device 20 may transcribe the voice recording from user 10A into text that includes a group of words (304). Following the transcription of the voice recording from user 10A into the text, voice training module 28 of server device 20 may store an association between a portion of each respective word from the group of words and a corresponding portion of the voice recording, wherein the corresponding portion of the voice recording is the portion of the voice recording from which the portion of the respective word was transcribed (306). Voice training module 28 of server device 20 may modify a speech synthesis voice associated with the user 10A based at least in part on the association (308). Voice training module 28 can repeat steps (302) through (308) upon receipt of future voice recordings (e.g. voicemail messages), thus improving the speech synthesis voice associated with the user 10A over time.

Figure 4:
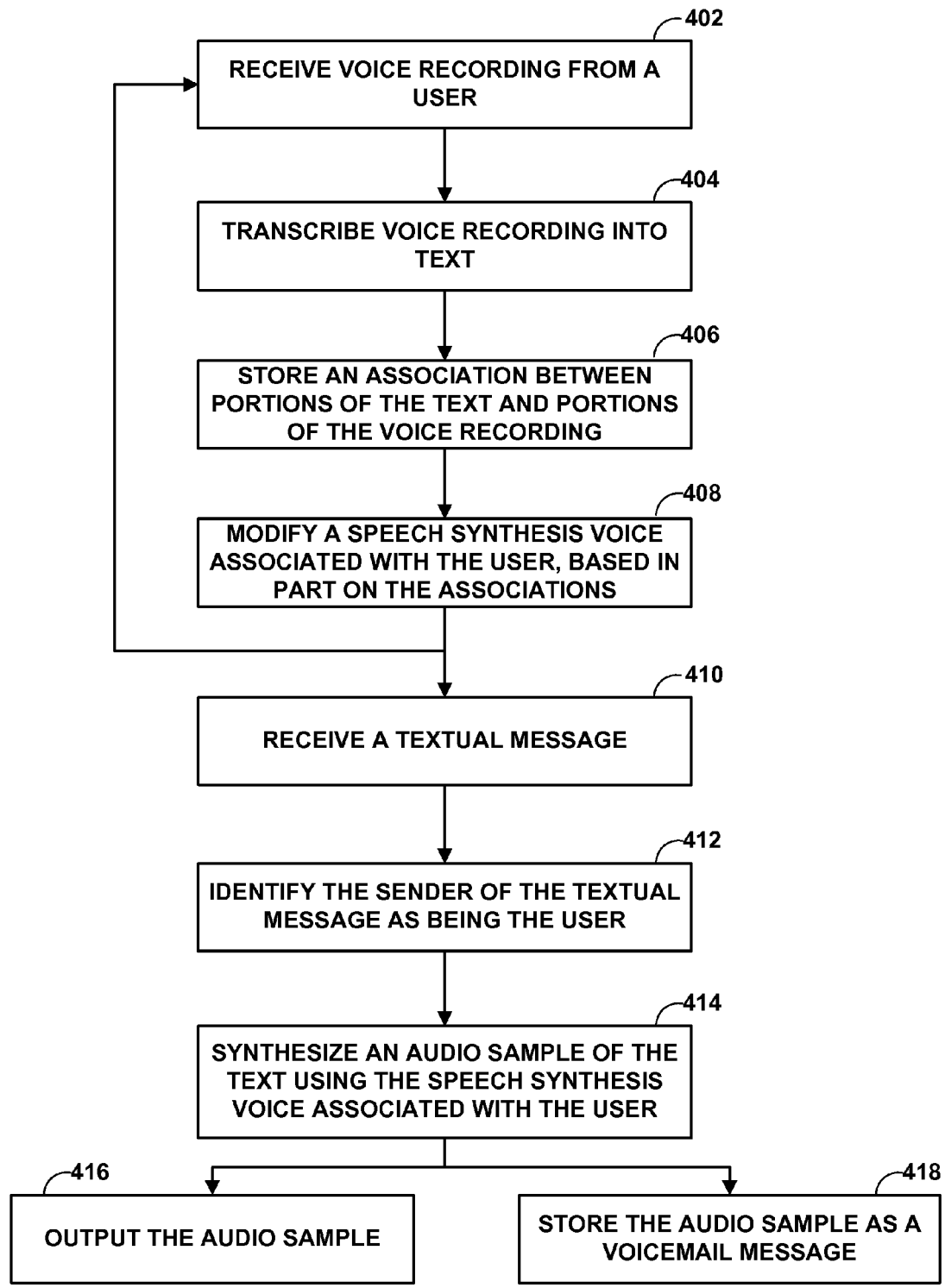
FIG. 4 is a flowchart illustrating an example operation for synthesizing speech using a speech synthesizer, in accordance with techniques of this disclosure.

FIG. 4 is a flowchart illustrating an example operation for synthesizing speech using a speech synthesizer, in accordance with techniques of this disclosure. One or more devices in a communication system may be perform the method of FIG. 4, for example, such as the system illustrated in FIG. 1. For purposes of illustration only, the example method is described below within the context of devices 4 of FIG. 1 and server device 20 of FIG. 1 and FIG. 2.

In one example, user 10A may send a voice recording to user 10B using device 4A, communicating on network 14. In that case, voice recording module 22 of server device 20 may receive the voice recording from user 10A and store the voice recording for subsequent retrieval by user 10B on device 4B (402). Upon receipt of the voice recording from user 10A, speech-to-text module 24 of server device 20 may transcribe the voice recording from user 10A into text that includes a group of words (404). Following the transcription of the voice recording from user 10A into the text, voice training module 28 of server device 20 may store an association between a portion of each respective word from the group of words and a corresponding portion of the voice recording, wherein the corresponding portion of the voice recording is the portion of the voicemail message from which the portion of the respective word was transcribed (406). Voice training module 28 of server device 20 may modify a speech synthesis voice associated with the user 10A based at least in part on the association (408). Voice training module 28 can repeat steps (402) through (408) upon receipt of future voice recordings (e.g. voicemail messages), thus improving the speech synthesis voice associated with the user 10A over time.

Server device 20 may subsequently receive a textual message (e.g., e-mail, SMS message, etc.), from a user 10 on a device 4, communicating on network 14, sent to user 10B (410). Upon receipt of the textual message, server device 20 may identify an identifier of the user 10 based on the received textual message and may select the speech synthesis voice within the speech synthesis voices data store 48, associated with the user based on the identifier. For example, using an identifier (i.e., phone number, e-mail address, etc.) associated with the textual message, server device 20 may perform a lookup of the identifier within an address book data store 50 and match the identifier to an entry within the address book data store 50 and from the entry, identify the sender of the textual message as being user 10A (412). Text-to-speech module 26 of server device 20 may select the speech synthesis voice associated with user 10A from the speech synthesis voices data store 48, to synthesize an audio sample of the textual message being read aloud by user 10A. (414). Text-to-speech module 26 may output the audio sample as an audible sound signal, by sending the audio sample to output device 36 of server device 20 (416). Text-to-speech module 26 may store the audio sample as a voice recording within the voice recordings data store 44 of server device 20 (418). User 10B, while using device 4B, may elect to read as text, the textual message from user 10A and may choose to receive and listen, as a voicemail message, the audio sample of the user 10A text message generated by server device 20.

Figure 5:
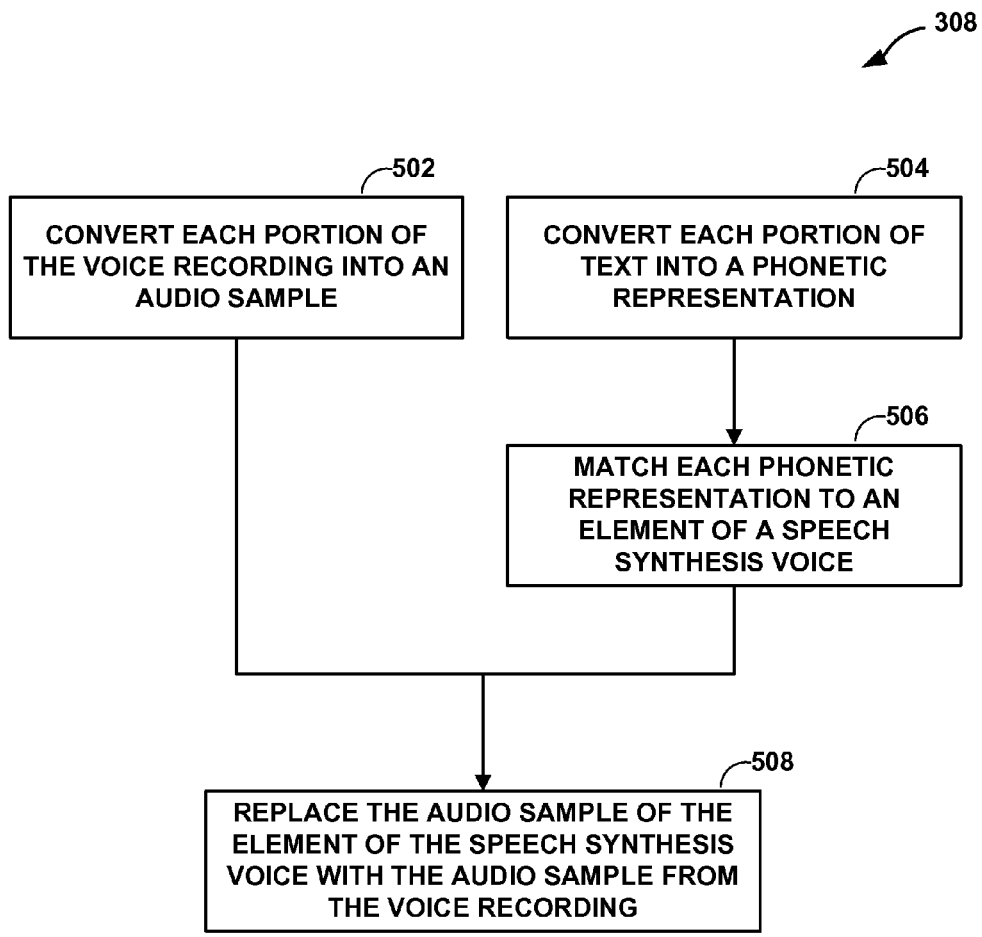
FIG. 5 is a flowchart illustrating an example operation for modifying a concatenative speech synthesis voice, in accordance with one example aspect of the techniques of this disclosure.

FIG. 5 is a flowchart illustrating an example operation for modifying a concatenative speech synthesis voice, in accordance with one example aspect of the techniques of this disclosure. One or more devices in a communication system may perform the method of FIG. 5, for example, such as the system illustrated in FIG. 1. For purposes of illustration only, the example method is described below within the context of devices 4 of FIG. 1 and server device 20 of FIG. 1 and FIG. 2. Steps (502) through (508) within FIG. 5 corresponds to step (308) shown in FIG. 3.

As described above with respect to FIG. 3, voice training module 28 of server device 20 may modify a speech synthesis voice associated with the user 10A based at least in part on the association (308). FIG. 5 illustrates one example technique that voice training module 28 may employ for modifying the speech synthesis voice based on the association between the portions of the transcribed text of the received voice recording and the portions of the audio of the voice recording. Each speech synthesis voice associated with user 10A may contain a series of elements. Each element from the series of elements comprises both a phonetic representation of text and an audio sample. Voice training module 28 of server device 20 may convert the corresponding portion of the voice recording into an audio sample (502). Voice training module 28 of server device 20 may convert the portion of the respective word of the transcribed text into a phonetic representation (504). Voice training module 28 of server device 20 may match the phonetic representation of the portion of the respective word to an element of the speech synthesis voice associated with user 10A that contains the same phonetic representation of text (506). Voice training module 28 of server 20 may replace the audio sample of the element of the speech synthesis voice associated with user 10A with the audio sample of the corresponding portion of the voice recording (508).

Figure 6:
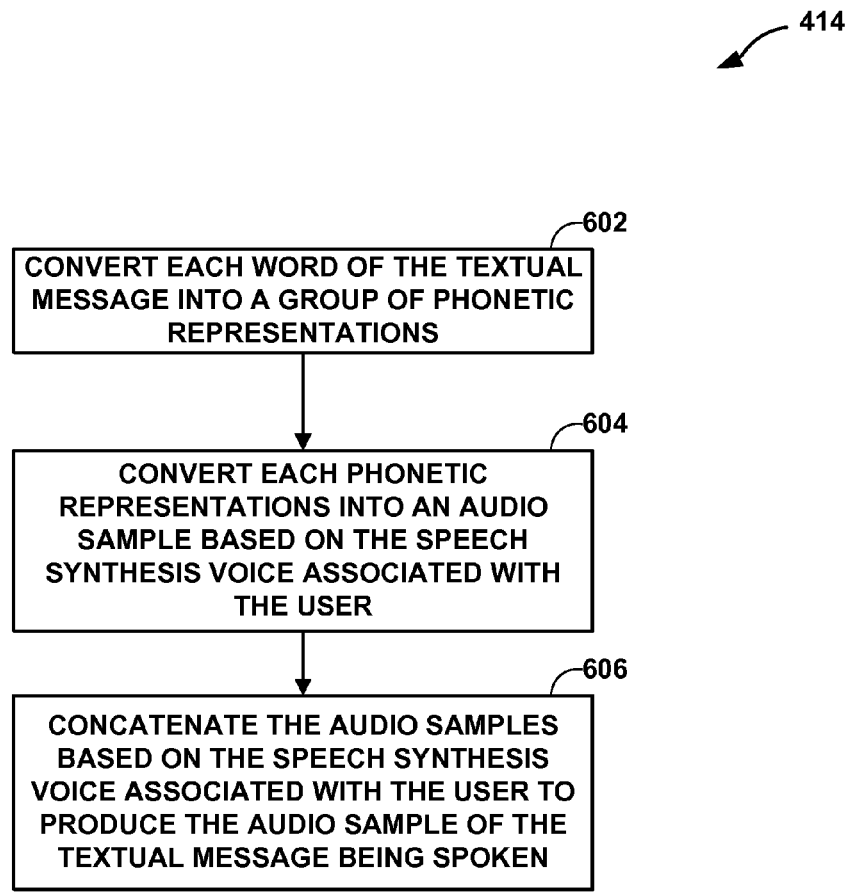
FIG. 6 is a flowchart illustrating an example operation for synthesizing an audio sample using a concatenative speech synthesis voice that has been modified, in accordance with one example aspect of the techniques of this disclosure.

FIG. 6 is a flowchart illustrating an example operation for synthesizing an audio sample using a concatenative speech synthesis voice that has been modified, in accordance with one example aspect of the techniques of this disclosure. One or more devices in a communication system may perform the method of FIG. 6, for example, such as the system illustrated in FIG. 1. For purposes of illustration only, the example method is described below within the context of devices 4 of FIG. 1 and server device 20 of FIG. 1 and FIG. 2. Steps (602) through (606) within FIG. 6 corresponds to step (414) shown in FIG. 4.

Text-to-speech module 26 of server device 20 may synthesize the audio sample of the textual message being read aloud by a user 10A using a concatenative text-to-speech system. For example, the text-to-speech system of server device 20 may receive the speech synthesis voice associated with user 10A and the textual message received from user 10A as inputs. The textual message received from user 10A may contain a group of textual message words. The text-to-speech system of server device 20 may convert each textual message word into a corresponding group of phonetic representations (602). The text-to-speech system of server device 20 may convert each of the phonetic representations into a corresponding audio sample based on the speech synthesis voice associated with user 10A (604). The text-to-speech system of server device 20 may concatenate each of the audio samples corresponding to each of the phonetic representations to produce the audio sample of the textual message being spoken (606). As described above with respect to FIG. 4, Text-to-speech module 26 of server device 20 may then output the audio sample of the textual message being spoken.

Figure 7:
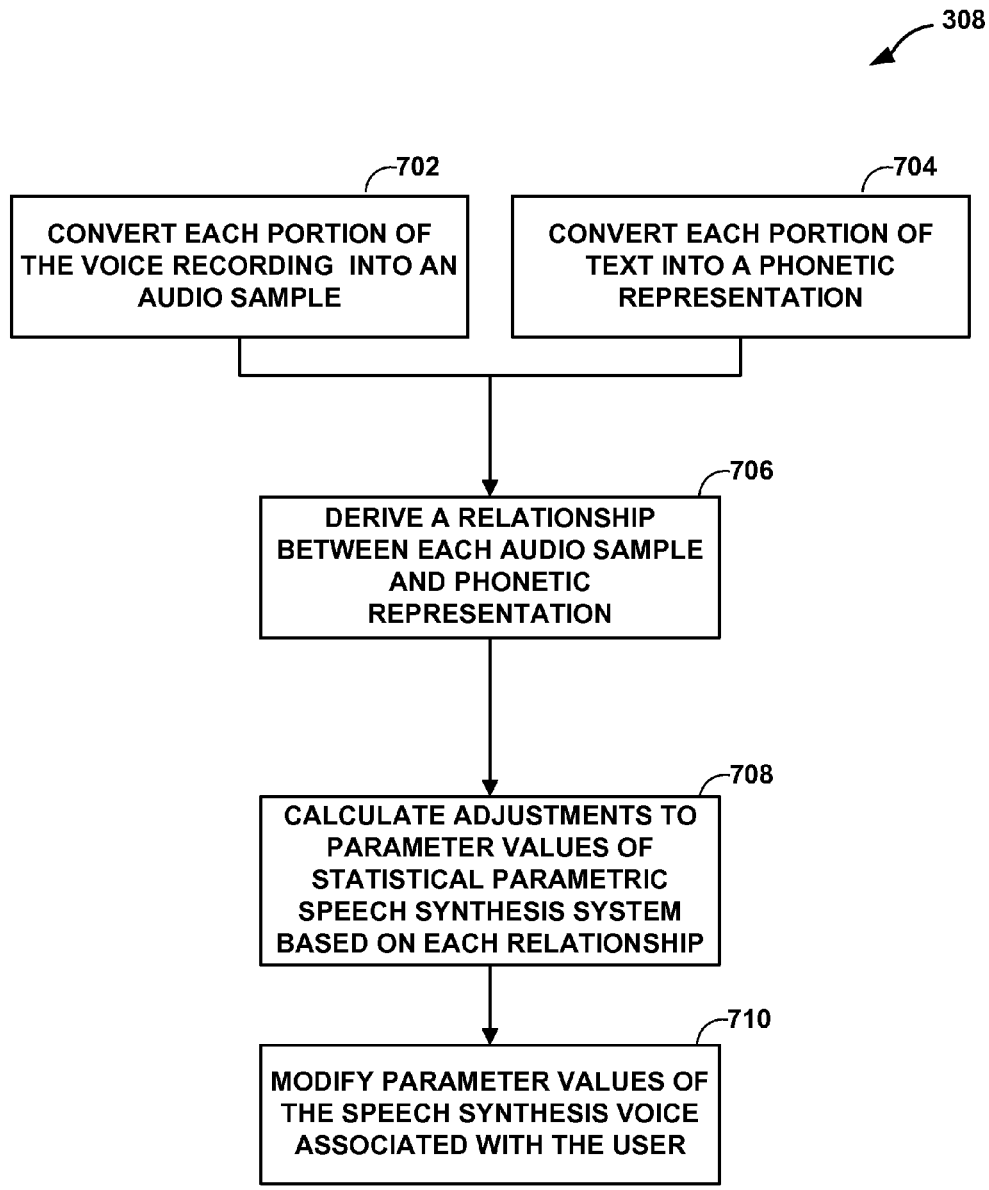
FIG. 7 is a flowchart illustrating an example operation for modifying a statistical parametric speech synthesis voice, in accordance with one example aspect of the techniques of this disclosure.

FIG. 7 is a flowchart illustrating an example operation for modifying a statistical parametric speech synthesis voice, in accordance with one example aspect of the techniques of this disclosure. One or more devices in a communication system may perform the method of FIG. 7, for example, such as the system illustrated in FIG. 1. For purposes of illustration, the example method is described below within the context of devices 4 of FIG. 1 and server device 20 of FIG. 1 and FIG. 2. Steps (702) through (710) within FIG. 7 may correspond to step (308) shown in FIG. 3.

As described above with respect to FIG. 3, voice training module 28 of server device 20 may modify a speech synthesis voice associated with the user 10A based at least in part on the association (308). FIG. 7 illustrates one example technique that voice training module 28 may employ for modifying the speech synthesis voice based on the association between the portions of the transcribed text of the received voice recording and the portions of the audio of the voice recording when a statistical parametric speech synthesis system receives as input, the speech synthesis voice. Each speech synthesis voice associated with user 10A may contain a series of speech parameters (e.g., frequency spectrum, fundamental frequency, rhythm, stress, intonation, etc.) and each parameter from the series of parameters may contain a value particular to the user. Voice training module 28 of server device 20 may convert the corresponding portion of the voice recording into an audio sample (702). Voice training module 28 of server device 20 may convert the portion of the respective word of the transcribed text into a phonetic representation (704). Voice training module 28 of server device 20 may derive a relationship between the phonetic representation of the portion of the respective word with the corresponding audio sample of the voice recording (706). Voice training module 28 of server 20 may calculate, based on the relationship, adjustments to the series of parameter values (708). Voice training module 28 of server 20 may modify, based on the adjustments, the parameter values of the speech synthesis voice associated with the user (710).

Figure 8:
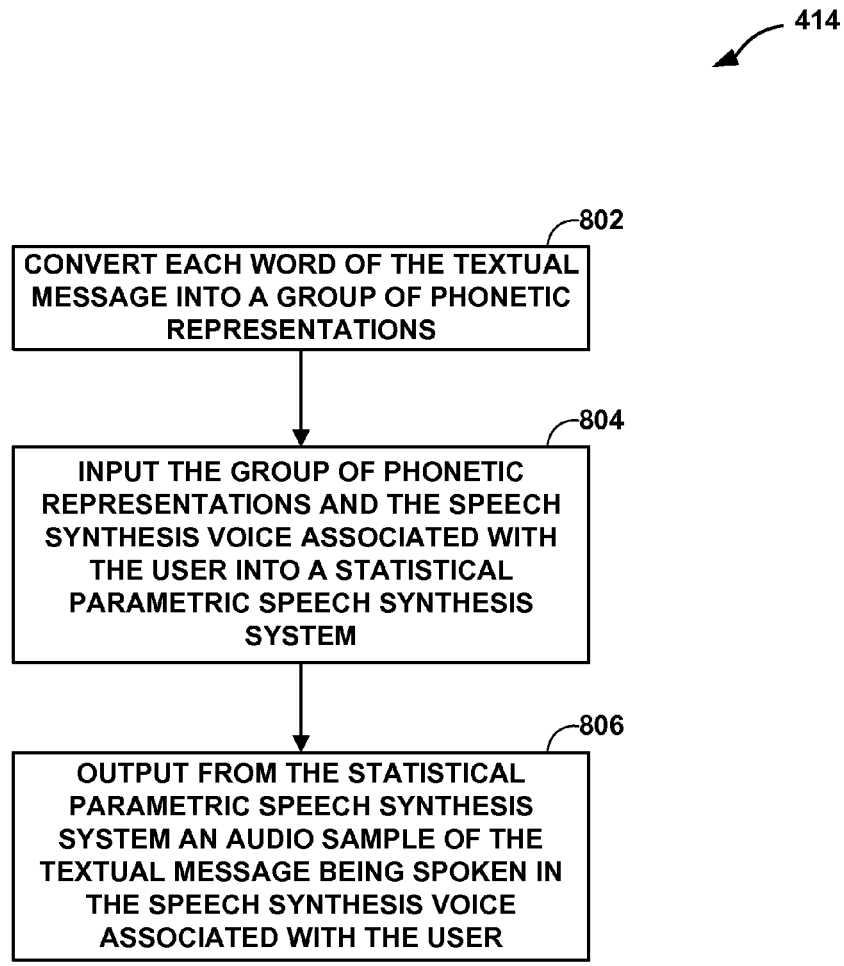
FIG. 8 is a flowchart illustrating an example operation for synthesizing an audio sample using a statistical parametric speech synthesis voice that has been modified, in accordance with one example aspect of the techniques of this disclosure.

FIG. 8 is a flowchart illustrating an example operation for synthesizing an audio sample using a statistical parametric speech synthesis voice that has been modified, in accordance with one example aspect of the techniques of this disclosure. One or more devices in a communication system may perform the method of FIG. 8, for example, such as the system illustrated in FIG. 1. For purposes of illustration, the example method is described below within the context of devices 4 of FIG. 1 and server device 20 of FIG. 1 and FIG. 2. Steps (802) through (806) within FIG. 8 may correspond to step (414) shown in FIG. 4.

Text-to-speech module 26 of server device 20 may contain a statistical parametric speech system as described above with respect to FIG. 2. Text-to-speech module 26 of server device 20 may synthesize the audio sample of the textual message being read aloud by a user 10A using a statistical parametric text-to-speech system. For example, the text-to-speech system of server device 20 may receive the speech synthesis voice associated with user 10A and the textual message received from user 10A as inputs. The textual message received from user 10A may contain a group of textual message words. The text-to-speech system of server device 20 may convert each textual message word into a corresponding group of phonetic representations (802). The text-to-speech system of server device 20 may input the group of phonetic representations and the speech synthesis voice associated with the user into a statistical parametric speech synthesis system (804). The text-to-speech system of text-to-speech module 26 may output an audio sample of the textual message being spoken in the speech synthesis voice associated with the user (806). As described above with respect to FIG. 4, text-to-speech module 26 of server device 20 may then output the audio sample of the textual message being spoken.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable storage medium comprising instructions that, when executed, cause one or more processors to perform one or more of the operations described above. For example, the computer-readable storage medium may store such instructions for execution by a processor. Any combination of one or more computer-readable storage medium(s) may be utilized.

A computer-readable storage medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, and magnetic or optical data storage media, as non-limiting examples. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage medium may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following claims.

What is claimed is:

1. A method comprising:
    receiving, by a system, a voicemail associated with a user;
    transcribing, by the system, the voicemail into text that includes a group of words;
    storing, by the system, an association between a portion of each respective word from the group of words and a corresponding portion of the voicemail, wherein the corresponding portion of the voicemail is the portion of the voicemail from which the portion of the respective word was transcribed;
    generating, by the system, a voiceprint from the voicemail;
    comparing, by the system, the voiceprint to voiceprints generated from previously received voicemails;
    identifying, by the system, based at least in part on the comparison and a portion of the voiceprints generated from the previously received voicemails, at least one matching voiceprint;
    selecting, by the system, based at least in part on the at least one matching voiceprint, a speech synthesis voice associated with the user; and
    determining, by the system, a modification to the speech synthesis voice associated with the user based at least in part on the association between the portion of each respective word from the group of words and the corresponding portion of the voicemail.

2. The method of claim 1, further comprising:
    modifying, by the system, the speech synthesis voice associated with the user based at least in part on the modification.

3. The method of claim 2, wherein the speech synthesis voice comprises a series of parameters, wherein each parameter from the series of parameters comprises a value, wherein modifying the speech synthesis voice comprises:
    converting, by the system, the portion of the respective word into a phonetic representation of the portion of the respective word;
    converting, by the system, the corresponding portion of the voicemail into an audio sample of the corresponding portion of the voicemail;
    deriving, by the system, a relationship between the phonetic representation of the respective word and the audio sample of the corresponding portion of the voicemail; and
    modifying, by the system, the values of each parameter of the speech synthesis voice based on the relationship.

4. The method of claim 2, wherein the speech synthesis voice comprises a series of elements, wherein each element from the series of elements comprises both a phonetic representation of text and an audio sample, wherein modifying the speech synthesis voice comprises:
    converting, by the system, the portion of the respective word into a phonetic representation of the portion of the respective word;
    converting, by the system, the corresponding portion of the voicemail into an audio sample of the corresponding portion of the voicemail;
    matching, by the system, the phonetic representation of the portion of the respective word to an element of the speech synthesis voice that contains the same phonetic representation of text; and
    replacing, by the system, the audio sample of the element of the speech synthesis voice with the audio sample of the corresponding portion of the voicemail.

5. The method of claim 2, wherein the voicemail is a first voicemail associated with a first user, the method further comprising:
    receiving, by the system, a second voicemail associated with a second user;
    identifying, by the system, an identifier of the second user,
    selecting, by the system, a second speech synthesis voice, wherein the second speech synthesis voice is associated with the identifier of the second user; and
    modifying, by the system, the second speech synthesis voice associated with the identifier of the second user based at least in part on the association.

6. The method of claim 1, further comprising:
    identifying, by the system, an identifier of the user based on the received voicemail; and
    selecting, by the system, the speech synthesis voice corresponding to the determination of the modification, based on the identifier of the user.

7. The method of claim 6, wherein identifying the identifier of the user comprises:
    performing, by the system, a lookup in an address book based at least in part on a phone number associated with the voicemail to identify an entry of the address book associated with the user; and
    obtaining, by the system, the identifier from the entry of the address book associated with the user.

8. The method of claim 1, wherein the voicemail is received by the system from a first application, the method further comprising:

receiving, by the system, a textual message from a second application;

identifying, by the system, an identifier of the user based on the textual message;

selecting, by the system, the speech synthesis voice associated with the user based on the identifier; and synthesizing, by the system, an audio sample of the textual message being spoken using the speech synthesis voice associated with the user.

9. The method of claim 8, wherein synthesizing the audio sample of the textual message being spoken comprises inputting the speech synthesis voice associated with the user and the textual message into a text-to-speech system and outputting from the text-to-speech system the audio sample of the textual message being spoken.

10. The method of claim 9, wherein the textual message is made of a group of textual message words, the method further comprising:

prior to outputting from the text-to-speech system the audio sample of the textual message being spoken, converting, by the text-to-speech system, each textual message word of the textual message into a group of phonetic representations;

converting, by the text-to-speech system, each of the phonetic representations of each textual message word of the textual message into a corresponding audio sample based on the speech synthesis voice associated with the user; and concatenating, by the text-to-speech system, each of the audio samples corresponding to each of the phonetic representations to produce the audio sample of the textual message being spoken.

11. The method of claim 8, wherein the textual message comprises an electronic mail message (e-mail) or a simple messaging service (SMS) message.

12. The method of claim 8, further comprising:

outputting, by the system, the audio sample as an audible sound signal.

13. The method of claim 8, further comprising:

storing, by the system, the audio sample as a second voicemail.

14. The method of claim 1, further comprising:

receiving, by the system, corrections to the transcribed text of the voicemail;

updating, by the system, the stored association based at least in part on the corrections; and modifying, by the system, the speech synthesis voice associated with the user based at least in part on the stored association.

15. The method of claim 14, wherein receiving the corrections to the transcribed text comprises receiving the corrections to the transcribed text from the user.

16. The method of claim 1, wherein the voicemail is a first voicemail, and wherein the group of words is a first group of words, the method further comprising:

receiving, by the system, a second voicemail associated with the user;

transcribing, by the system, the second voicemail into text that includes a second group of words;

storing, by the system, an association between each word of the second group of words and a corresponding portion of the second voicemail, wherein a word of the second group of words is associated with a portion of the second voicemail, wherein a word of the first group of words is associated with a portion of the first voicemail, wherein the portion of the first voicemail and the portion of the second voicemail are the same, and wherein the word of the first group of words is different than the word of the second group of words;

updating, by the system, the stored association between the word of the first group of words and the portion of the first voicemail, based at least in part on the stored association between the word of the second group of words and the portion of the second voicemail; and modifying, by the system, the speech synthesis voice associated with the user based at least in part on the association.

17. The method of claim 1, wherein the voicemail associated with the user comprises an audio sample embedded in a video message associated with the user.

18. The method of claim 1, wherein the system is a server device.

19. The method of claim 1, wherein the system is a portable computing device.

20. A non-transitory computer-readable storage medium comprising instructions that, when executed, cause one or more processors to perform operations comprising:

receiving, a voicemail associated with a user;

transcribing, the voicemail into text that includes a group of words;

storing, an association between a portion of each respective word from the group of words and a corresponding portion of the voicemail, wherein the corresponding portion of the voicemail is the portion of the voicemail from which the portion of the respective word was transcribed;

generating, a voiceprint from the voicemail;

comparing, the voiceprint to voiceprints generated from previously received voicemails;

identifying, based at least in part on the comparison and a portion of the voiceprints generated from the previously received voicemails, at least one matching voiceprint;

selecting, based at least in part on the at least one matching voiceprint, a speech synthesis voice associated with the user; and determining, a modification to the speech synthesis voice that is associated with the user based at least in part on the association between the portion of each respective word from the group of words and the corresponding portion of the voicemail.

21. A system comprising one or more processors, the one or more processors being configured to perform operations comprising:

receiving, by the system, a voicemail associated with a user;

transcribing, by the system, the voicemail into text that includes a group of words;

storing, by the system, an association between a portion of each respective word from the group of words and a corresponding portion of the voicemail, wherein the corresponding portion of the voicemail is the portion of the voicemail from which the portion of the respective word was transcribed;

generating, by the system, a voiceprint from the voicemail;

comparing, by the system, the voiceprint to voiceprints generated from previously received voicemails;

identifying, by the system, based at least in part on the comparison and a portion of the voiceprints generated from the previously received voicemails, at least one matching voiceprint;

selecting, by the system, based at least in part on the at least one matching voiceprint, a speech synthesis voice associated with the user; and determining, by the system, a modification to the speech synthesis voice that is associated with the user based at least in part on the association between the portion of each respective word from the group of words and the corresponding portion of the voicemail.

22. A computing device comprising one or more processors, the one or more processors being configured to perform operations comprising:

receiving, by the computing device, a voicemail associated with a user;

transcribing, by the computing device, the voicemail into text that includes a group of words;

storing, by the computing device, an association between a portion of each respective word from the group of words and a corresponding portion of the voicemail, wherein the corresponding portion of the voicemail is the portion of the voicemail from which the portion of the respective word was transcribed;

generating, by the computing device, a voiceprint from the voicemail;

comparing, by the computing device, the voiceprint to voiceprints generated from previously received voicemails;

identifying, by the computing device, based at least in part on the comparison and a portion of the voiceprints generated from the previously received voicemails, at least one matching voiceprint;

selecting, by the computing device, based at least in part on the at least one matching voiceprint, a speech synthesis voice associated with the user; and determining, by the computing device, a modification to the speech synthesis voice associated with the user based at least in part on the association between the portion of each respective word from the group of words and the corresponding portion of the voicemail.

23. The computing device of claim 22, wherein the computing device is a client device, the operations further comprising:

transmitting, by the client device, the modification on a communications network, wherein the communications network is used for communicating with one or more server devices; and receiving, by the client device, the speech synthesis voice associated with the user and modified based on the modification.

24. The computing device of claim 22, the operations further comprising:

modifying, by the computing device, the speech synthesis voice associated with the user based at least in part on the modification.

25. The computing device of claim 24, wherein the speech synthesis voice comprises a series of parameters, wherein each parameter from the series of parameters comprises a value, wherein modifying the speech synthesis voice further comprises:

converting, by the computing device, the portion of the respective word into a phonetic representation of the portion of the respective word;

converting, by the computing device, the corresponding portion of the voicemail into an audio sample of the corresponding portion of the voicemail;

deriving, by the computing device, a relationship between the phonetic representation of the respective word and the audio sample of the corresponding portion of the voicemail; and modifying, by the computing device, the values of each parameter of the speech synthesis voice based on the relationship.

26. The computing device of claim 24, wherein the computing device is a server device, the operations further comprising:

transmitting, by the server device, the speech synthesis voice associated with the user on a communications network wherein the communications network is used for communicating with one or more client devices.

27. The computing device of claim 24, the operations further comprising:

receiving, by the computing device, a textual message associated with the user;

synthesizing, by the computing device, an audio sample of the textual message being spoken using the speech synthesis voice associated with the user.

28. The computing device of claim 27, the operations further comprising:

outputting, by the computing device, the audio sample as an audible sound signal.

29. The computing device of claim 27, wherein the computing device is a server device, the operations further comprising:

transmitting, by the server device, the audio sample on a communications network, wherein the communications network is used for communicating with one or more client devices.

* * * * *